Jan. 31, 1961 P. H. DAVEY Re. 24,932

LIGHT METAL VANE FOR ROTARY COMPRESSORS

Original Filed Jan. 29, 1958 2 Sheets-Sheet 1

INVENTOR.
PAUL H. DAVEY

BY

Hyde, Meyer, Baldwin & Doran
ATTORNEYS

Jan. 31, 1961 P. H. DAVEY Re. 24,932

LIGHT METAL VANE FOR ROTARY COMPRESSORS

Original Filed Jan. 29, 1958 2 Sheets-Sheet 2

INVENTOR.
PAUL H. DAVEY

BY

Hyde, Myers, Baldwin & Doran
ATTORNEYS

United States Patent Office

Re. 24,932

Reissued Jan. 31, 1961

24,932

LIGHT METAL VANE FOR ROTARY COMPRESSORS

Paul H. Davey, Kent, Ohio, assignor of one-third to Paul H. Davey, Jr., and one-third to Joseph T. Myers Original No. 2,905,376, dated Sept. 22, 1959, Ser. No. 711,820, Jan. 29, 1958. Application for reissue Mar. 4, 1960, Ser. No. 12,886

4 Claims. (Cl. 230—152)

Matter enclosed in heavy brackets [ ] appears in the original patent but forms no part of this reissue specification; matter printed in italics indicates the additions made by reissue.

This invention relates to improvements in a light metal vane for sealing between [the rotor and stator of] *relatively rotatable generally cylindrical rotor and stator members having their axes parallel and eccentric, such as* a rotary compressor *or a rotary air motor,* and more particularly to such a vane of metal of high heat conducting capacity having a thin abrasion-resisting coating over the vane and bonded thereto, and an outside thin coating of smooth self-lubricating material substantially bonded to the abrasion-resisting coating.

One of the objects of the present invention is to provide an improvement in the sealing vanes of a rotary compressor or pump of a usual type wherein a cylindrical rotor is rotatably mounted within a cylindrical stator with the axes of the stator and rotor members eccentric, there being a plurality of radially extending slots in one of the members, usually the rotor, opening radially outwardly, and a plurality of vanes snugly received one or more in each of the slots and reciprocatable therein to maintain contact with the wall of the other of said members, usually the stator, so that air or other gas entering the stator at or near the point of greatest eccentricity is carried around the rotor by the vanes and exhausted from the stator at a point near the zone of least eccentricity.

Another object of the present invention is the provision of an improved vane for sealing between the rotor and stator of a rotary compressor wherein the vane is constructed from a solid body of metal of low density and high heat conducting capacity chosen from the group consisting of essentially magnesium and essentially aluminum, wherein the vanes are first given a very hard coating to resist abrasion, after which there is applied an outer coating to each vane of self-lubricating material which covers the minute irregularities in the abrasion-resisting coating and renders each vane smooth and self-lubricating as it reciprocates in its receiving slot in the rotor.

Other objects and advantages of this invention will be apparent from the accompanying description and drawings and the essential features thereof will be set forth in the appended claims.

In the drawings:

Fig. 4 is a diagrammatic fragmental sectional view of my improved rotor and vane; while

Figure 1:
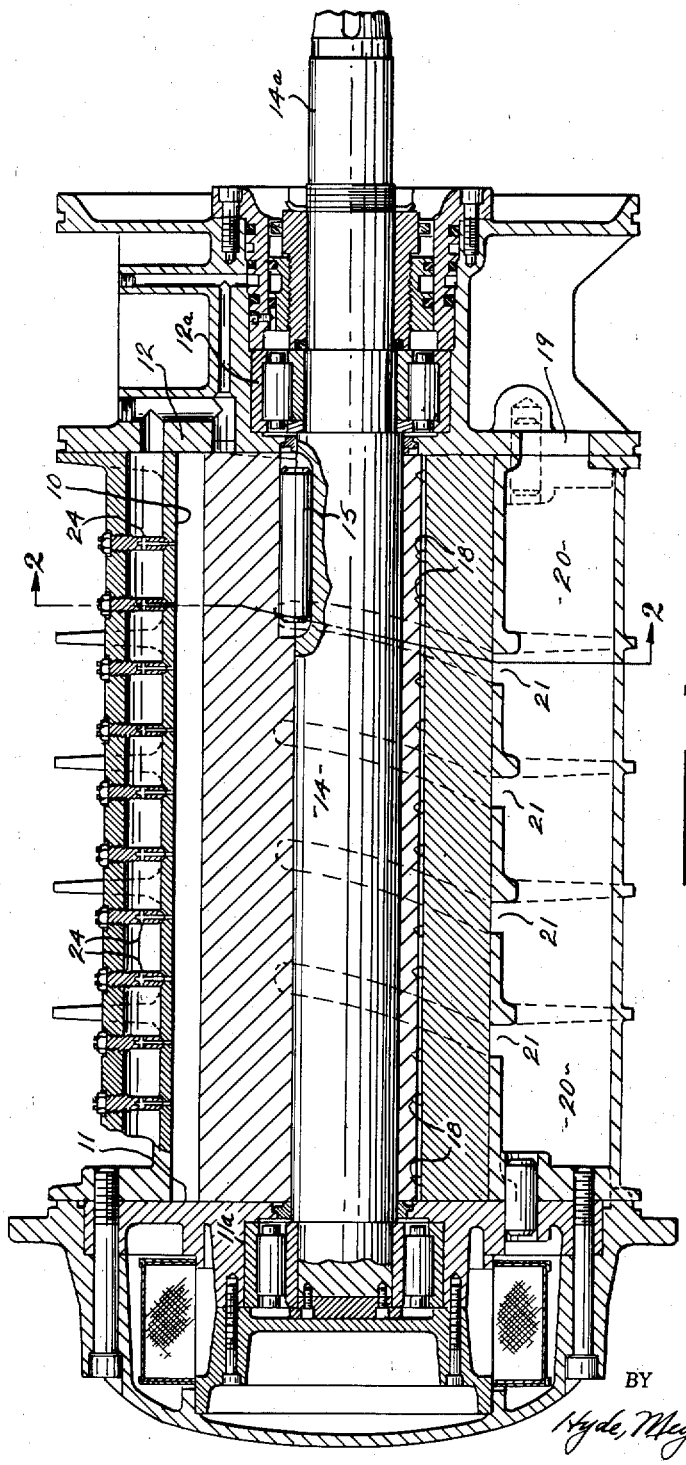
Fig. 1 is a central sectional view through a rotary compressor embodying my invention.
Figure 2:
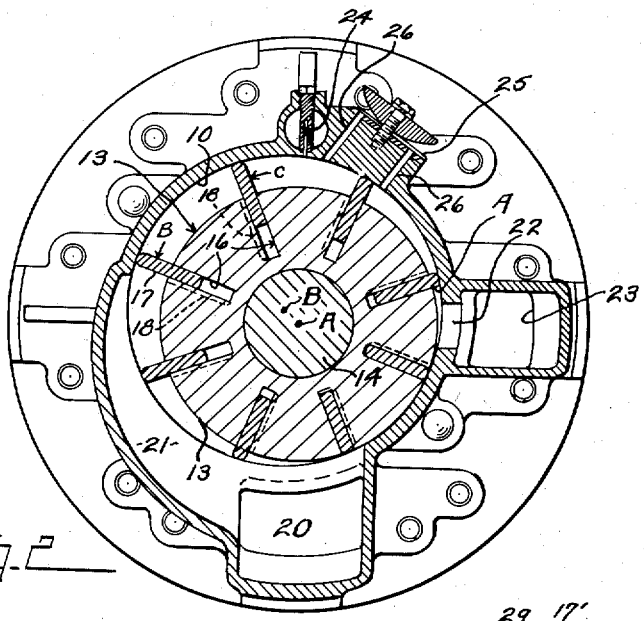
Fig. 2 is a transverse sectional view of the same taken along the line 2—2 of Fig. 1.

Referring now to Figs. 1 and 2, it will be understood that my invention may be applied to many types of rotary compressors and pumps but is here shown as applied to a rotary compressor wherein an outer housing provides a generally cylindrical stator wall 10 closed at its opposite ends by the end covers 11 and 12. Within the stator is a rotor 13 which is also generally cylindrical about an axis A which is eccentric to and parallel to the axis B of the stator 10. The rotor is mounted on a central shaft 14 to which it is non-rotatable secured by means of a dowel pin 15. The shaft is suitably supported by bearings 11a and 12a in the end covers 11 and 12 respectively and suitable seals are provided to prevent the escape of air or oil and to prevent the entrance of dirt particles to the interior of the compressor. This general structure of the compressor is well known in the art and the details thereof have nothing to do with the present invention. The shaft 14 has an extension 14a by which the power is applied to rotate the rotor 13. Those familiar with this art will understand that the rotor has slight clearance against the end covers 11 and 12 and is provided with a plurality of radially extending slots 16 in each of which a sealing vane 17 is snugly slidable. Along the length of each slot 16 there are provided shallow radially extending vent openings 18 to permit air to enter and escape from the bottom of each slot 16 as its vane 17 reciprocates therein. Air or other gas to be pumped enter the housing through an opening 19 into a manifold 20, here shown at the bottom of the stator housing, from which a plurality of intake ports 21 lead upwardly through an arc slightly over 90 degrees in extent. The fluid to be pumped thus enters between the rotor and the stator in the zone of greatest eccentricity and is carried by the vanes 17 around the periphery of the rotor and stator to a plurality of exhaust ports 22 which are located close to the zone of least eccentricity. The compressed fluid then passes out an exhaust port 23 to a place of use.

In the present embodiment, a 600 cubic foot per minute compressor has a rotor about 24 inches long and approximately 9 inches in diameter rotating in a stator having a cylindrical diameter approximately 10 inches in diameter. The clearance between the rotor and stator at the zone of greatest eccentricity is therefore about one inch while the clearance at the zone of least eccentricity is as near zero as possible for practical operation.

A compressor of this sort receiving air at atmospheric pressure and delivering the same at about 100 pounds per square inch will be heated approximately 425 degrees Fahrenheit. Much of this heat is carried out with the exhausted air but to aid in the removal of heat from the interior of the compressor and to lubricate the same, it is customary to introduce an oil fog through a plurality of nozzles 24 located at one or more zones about the periphery.

When a compressor is started up after having been idle for some time, oil may be entrapped in the interior of the compressor. Since a liquid is practically incompressible, damage might occur unless escape is provided. To this end, a plurality of relief valves 25 are provided normally closing passages 26 which communicate with the space between the rotor and stator. The valve 25 is stiff enough to resist the pressure of the fluid ordinarily pumped by the compressor but will release any liquid caught inside the compressor, such as oil, so as to prevent damage to the parts.

In modern rotary compressors, typical operating speeds are in the range of 1750 to 3500 r.p.m., depending upon the size of the compressor. This involves reversing movements of the vanes 17 a similar number of times per minute, the radial inward and outward motion usually being approximately 1½ inches total vane travel of 2 to 3 inches per revolution of the rotor.

It can readily be seen that a vane of say ¼ inch thickness, 2 inches width and 10 to 24 inches length, if made of iron, steel, bronze or other common metals, would involve tremendous centrifugal forces when thrown radially outward as the rotor travels at the speeds indicated, and would, therefore, be likely to result in excessive vibration, wear and operating troubles. This centrifugal force may even be great enough to break down the protecting film of oil between vane 17 and stator 10. On the other hand, the light metals, including their common alloys, are so soft that they could not be expected to resist the abrasion of this rapid reciprocating movement, with a heavy pressure differential between the leading and trailing surfaces of a vane 17 when compressing gases or air, say up to 100 pounds per square inch as indicated above.

It has therefore been common heretofore to form the vanes 17 of laminated plastic material in an attempt to get sufficient strength, resistance to heat and wear, and still obtain suitable sealing between the rotor and stator. Such laminated vanes are in common use today even though they have given great operating difficulties resulting largely from the progressive delamination of the vanes which operate at a relatively high temperature in a heavy mist of oil fog, together with the high state of friction between the vanes 17 and their slots 16 and between the leading edges of the vanes 17 and the stator 10. Another difficulty of the laminated vane has been the deterioration of the oil used in the lubricating oil system. It can be seen that the heat of compression in a rotary compressor such as this is largely accumulated at the leading edge of the vane which is the last portion of the vane in contact with the air as it reaches its point of greatest compression and therefore the zone of greatest temperature. This, together with the friction of the radially outermost edge of the vane 17 against the stator 10 causes the radially outermost edge of each vane to become very hot. Since the transfer of heat through a laminated plastic vane is poor, the leading edges of these vanes become quite hot and cause a progressive delamination of the blades and a destructive action on the lubricating oil which is heated against the vane above its polymerization point and often breaks down into gummy masses. It is of fundamental importance to the preservation of the effective life of the lubricating oil of the compressor, and to its functions in lubricating the moving parts, sealing the compression process, and cooling the discharged gases, that the heat naturally concentrated at the leading edge of the blades be deposited in a material of high heat conducting quality, and spread quickly over the entire surface of the blades from which it can be quickly and effectively removed by the mist of lubricating oil.

Figure 5:
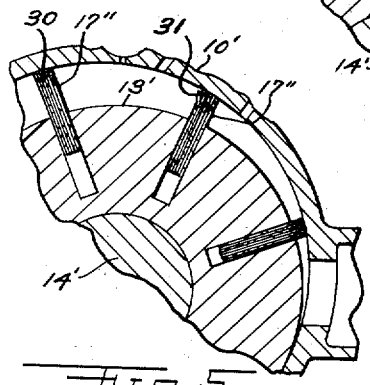
Fig. 5 is a diagrammatic fragmental sectional view of a rotor and vanes of the prior art.
Figure 4:
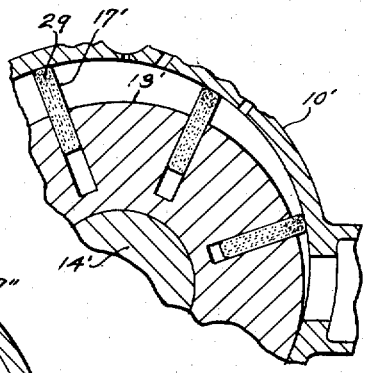

Referring now to Figs. 2, 4 and 5, an important distinction between my invention and the commonly used prior art will now be explained. In Fig. 2 I have indicated at A the leading or radially outermost edge of a vane near the compressed air discharge port. This leading edge is the one longest exposed to the heat of compression and therefore the temperature tends to build up at that zone. In the laminated vanes of the prior art, such heat does not dissipate rapidly because the laminated plastic is a poor conductor of heat. In the case of my improved vane, the vanes of magnesium and aluminum are good conductors of heat and, therefore, the heat does not build up at the leading edge as of A, but instead starts to dissipate throughout the body of the vane at once. A moment later, due to rotation of the rotor, large surfaces of the vane are exposed as indicated at B and C in Fig. 2. From these large surfaces, heat is transferred to the oil fog introduced at 24, and often at other points around the periphery, and the heat is thus carried out of the compressor. This quick distribution of heating and cooling effects throughout the body of the vanes 17 of my invention, prevent the building up of highly heated zones anywhere on the vanes and thus I avoid areas of concentrated heat which would otherwise tend to break down the lubricating oil into a gummy mass. In the diagrammatic showing of Fig. 4, I have indicated the stator 10', the rotor at 13', and the vanes 17'. I have here indicated by stippling 29 the distribution of heat throughout the vane 17. The stippling is only slightly more concentrated at the leading or radially outermost edge of the vane 17' and otherwise the stippling indicates that the heat is fairly evenly distributed throughout the body of the vanes 17'.

On the other hand, in the diagrammatic showing of Fig. 5, I have indicated the stator and rotor as before but have here indicated vanes 17'' as formed of laminated plastic of the prior art as explained heretofore. By the stippling 30 heavily concentrated at the radially outermost edge of the vanes, I have attempted to indicate that the heat is highly concentrated at these zones and the light stippling in the rest of the vane indicates that it is distributed very slightly throughout the rest of the body of the vane. Thus, in the prior art, the leading edges of the vanes become highly heated to a point where they cause a break down of the lubricating oil with consequent loss of lubrication and damage to the parts. I have also indicated in Fig. 5 at 31 a portion of the laminate breaking off near the leading edge of one of the blades 17''. This destruction is apparently caustd by the heat and the oil fog breaking down the organic binder between the plastic laminations and the resulting small particles of plastic material, as pointed out above, get caught at the zone of substantially zero clearance between the rotor and stator causing a violent destruction of one or the other or both.

On heavy continuous runs of rotary compressors, laminated plastic vanes begin to delaminate within a very few hours and within approximately 250 hours or less of constant full load operation they are likely to, and often do, begin to disintegrate at which time small particles of plastic material are carried loosely thorugh the compressor between the vanes 17. Since the clearance between the rotor and stator is close to zero at the zone of least eccentricity and at the point of greatest compression of the air, there is no place for these loose fragments to go. As a result, destruction of either the rotor or the stator must occur on the first subsequent revolution since there is no time allowed by a machine operating at typical rotary compressor speeds for the gradual deceleration which would be necessary to avoid destruction. It has, therefore, been commonly accepted in the industry that the blades 17 are expendable parts which must be replaced at predetermined periods if one is to avoid destruction of the compressor or pump.

It has been attempted to avoid the above-mentioned difficulties by making the vanes 17 of a solid body of metal of low density and high heat conducting capacity, such as magnesium and aluminum. These blades wore so rapidly due to the reciprocation in the slots 16 in a cast iron rotor as to be unacceptable for constant use. This was true even when the light metal vanes were coated with liquid or solid lubricants. It was then attempted to put a thin abrasion-resisting coating over the light metal vane and while this resulted in a longer life for the vane, the coating rapidly wore away the side walls of the slots 16 in the rotor and increased the friction, heat production and the power requirement for driving the compressor.

It was only after the above-mentioned failures, that the present invention produced my improved vane comprising a solid body of metal of low density and high heat conducting capacity chosen from the group consisting essentially of magnesium or essentially of aluminum with a thin abrasion-resisting coating covering the body of the vane and bonded to it, this coating either naturally or artificially providing an outer surface pitted all over with minute irregularities, and as an outer coating, a self-lubricating material was provided filling these irregularities and substantially bonded to the first named coating so that a light metal blade was provided which was resistant to abrasion but at the same time fitted to reciprocate smoothly in the slots 16 with only a minimum wear on such slots during long periods of operation.

EXAMPLE I

A vane was formed partially to the desired shape consisting essentially of magnesium, by which I mean to imply the use of magnesium or the common alloys thereof which retain the essential characteristics of magnesium. An abrasion-resisting coating approximately 0.001 inch thick was then formed completely encasing the vane body by electrolytically bonding the coating to the body by deposition out of an aqueous solution containing per gallon approximately 18 ounces potassium hydroxide, 4 ounces aluminum hydroxide, 4.5 ounces trisodium phosphate, 4.5 ounces anhydrous potassium fluoride, and 2.5 ounces potassium manganate using approximately 15 to 20 amperes per square foot for approximately 60 minutes. The resulting product was then sprayed with an uncured thermosetting polymerizable resin, such as B stage phenol formaldehyde resin, containing between about ¾ and 3½ pounds per gallon of a finely divided solid lubricant chosen from the group consisting of graphite and molybdenum disulfide, after which the vane was baked at a temperature of approximately 350 degrees Fahrenheit for 30 minutes, or sufficient to polymerize and harden the thermosetting resin and to tightly bond the lubricated particles in place.

EXAMPLE II

A vane 17 was first formed to proper size from a solid body consisting essentially of aluminum by which I mean to indicate aluminum and its common alloys which still retain the essential characteristics of aluminum. This vane was then subjected to the usual commercial anodizing treatment thereby forming an extremely hard thin coating of aluminum oxide bonded to the aluminum base and having a thickness of approximately 0.001 inch. The external surface of the vane so treated had a surface pitted all over with very minute irregularities. The vane was then sprayed with an uncured thermosetting polymerizable resin containing finely divided particles of graphite and/or molybdenum disulfide in the manner explained in connection with Example I.

Figure 3:
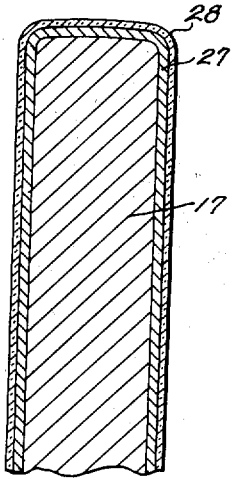
Fig. 3 is an enlarged fragmental sectional view through one of the vanes of Fig. 2 diagrammatically representing the improved vanes of my invention.

In Fig. 3 I have greatly enlarged and distorted a vane 17 to indicate at 27 the first or abrasion-resisting coating of Examples I and II, and at 28 I have indicated the outside thin coating of self-lubricating material substantially bonded to the abrasion-resisting coating. This outer coating is approximately 0.0002 inch to 0.001 inch thick and, therefore, Fig. 3 is tremendously exaggerated for the purpose of explanation.

I have thus produced an improved sealing vane for use in a rotary compressor which has many important advantages over the laminated plastic vane in general use today. In the first place, the disadvantage of delamination of the plastic vane is completely eliminated, together with the destruction of the rotor or stator by particles being caught in the compressor, because the solid metal blade which I use is not subject to such breakdown.

Secondly, aluminum weighs about the same and magnesium about 65 percent as much as the common plastic material. Each of these metals, however, has several times the strength of the common plastic materials. Therefore, my invention can use vanes thinner than the laminated plastic vanes presently in use, thus saving weight but having greater strength than the plastic vanes. This saving in weight reduces the centrifugal force effective to throw the vanes radially outwardly on each revolution of the rotor and thus reduces friction and vibration.

Thirdly, the high rate of heat transfer which is characteristic of magnesium and aluminum appears to have an important effect in preserving the useful life of lubricating oils used in the compressor, and in preventing the destructive action which occurs when the lubricating oils suddenly break down and become gummy masses due to contact with highly heated surfaces.

Fourthly, the vane surfaces according to my invention are both hard and smooth and thus avoid any rapid wearing either of the blades or of the rotor slots in which the vanes reciprocate. Vanes constructed according to my invention have been tested in a 600 cubic foot per minute compressor for 1000 hours at constant full load with very little wear on either the vanes or the rotor slots and without any operating difficulties whatsoever. This compressor equipped with my invention required less power to drive it than was called for when the identical compressor was furnished with laminated plastic vanes. At the same time, the lubricating oil in the compressor lubrication system remained in much better condition utilizing my improved vanes than when utilizing the plastic vanes. The useful life of the improved vanes may be safely estimated at ten times that of the laminated plastic vanes now universally employed in the industry; and in the intervening period of the use essentially eliminates the danger of mechanical disaster consequent from the delamination of plastic vanes and from sudden disintegration of lubricating oils.

Wherever in the specification and claims I have utilized the terms "magnesium" and "aluminum" I intend to include the common alloys of these metals wherein the modifiers in the alloy do not materially change the fundamental character of the basic metal.

What is claimed is:

1. [A vane for sealing between the rotor and the stator of a rotary compressor comprising] *A vane for sealing between relatively rotatable generally cylindrical rotor and stator members having their axes parallel and eccentric comprising* a solid body of metal of low density and high heat conducting capacity, a thin abrasion-resisting coating covering said body and bonded thereto, and an outside thin smooth coating of self-lubricating material substantially bonded to said abrasion-resisting coating.

2. [A vane for sealing between the rotor and the stator of a rotary compressor comprising] *A vane for sealing between relatively rotatable generally cylindrical rotor and stator members having their axes parallel and eccentric comprising* a solid body of metal of low density and high heat conducting capacity chosen from the group consisting essentially magnesium and essentially aluminum, a thin abrasion-resisting coating covering said body and bonded thereto, said coating having an outer surface pitted with minute irregularities, and an outer thin smooth coating of self-lubricating material filling said irregularities and bonded to said first named coating.

3. [A vane for sealing between the rotor and the stator of a rotary compressor comprising] *A vane for sealing between relatively rotatable generally cylindrical rotor and stator members having their axes parallel and eccentric comprising* a solid body of metal of low density and high heat conducting capacity chosen from the group consisting of essentially magnesium and essentially aluminum, an abrasion-resisting coating approximately 0.001 inch thick covering said body and bonded thereto, said coating having an outer surface substantially uniformly covered with minute irregularities, and an outer smooth coating approximately 0.0002 inch to 0.001 inch thick of self-lubricating material filling said irregularities and bonded to said first named coating.

4. [In combination, a rotary compressor having a cylindrical rotor and a cylindrical stator with their axes eccentric.] *In combination, a device having relatively*

*rotatable generally cylindrical rotor and stator members having their axes parallel and eccentric,* there being a plurality of radially extending slots in said rotor *member* opening outwardly, a plurality of vanes snugly received one in each of said slots and reciprocatable therein to maintain contact with the wall of said stator *member,* each of said vanes comprising a solid body of metal of low density and high heat conducting capacity, a thin abrasion-resisting coating covering said body, and an outside thin smooth coating of self-lubricating material substantially bonded to said abrasion-resisting coating.

References Cited in the file of this patent or the original patent

UNITED STATES PATENTS

| | | |
|---|---|---|
| 383,811 | Hoyt | May 29, 1888 |
| 1,943,561 | Staley | Jan. 16, 1934 |
| 2,514,196 | Bradley | July 4, 1950 |
| 2,752,302 | Maganus | June 26, 1956 |
| 2,905,376 | Davey | Sept. 22, 1959 |

FOREIGN PATENTS

| | | |
|---|---|---|
| 308,394 | Great Britain | Mar. 28, 1929 |